Patented Jan. 15, 1946

2,393,035

UNITED STATES PATENT OFFICE 2,393,035

PROCESS FOR RECOVERING RUBBER FROM FLESHY PLANTS

Roderick K. Eskew, Glenside, and Paul W. Edwards, Philadelphia, Pa., assignors to the United States of America as represented by Claude R. Wickard, Secretary of Agriculture, and his successors in office No Drawing. Application December 8, 1943, Serial No. 513,458

1 Claim. (Cl. 260—814)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a process of mechanically recovering rubber from fleshy rubber-bearing roots, such as the roots of Russian dandelions, for example, kok-saghyz, and tau-saghyz, in which the latex in the roots is contained in canals, and has among its objects obtaining, by simple means, rubber which is relatively free from dirt and plant impurities and is of good quality; eliminating the necessity of treating the roots of the plants by strong caustic chemicals to release the rubber from the plant tissues; making available the carbohydrates in the roots as a source of fermentable sugars capable of yielding ethyl alcohol; and such other objects as will be apparent from the following description and claims.

A customary procedure for recovering rubber from kok-saghyz or tau-saghyz comprises washing the roots, cutting them into small pieces, subjecting them to treatment in a diffusion battery for removal of the carbohydrates, grinding the cut roots, boiling them in a caustic chemical, such as alkali, to free the rubber from the plant tissues, and then separating the rubber from the commingled plant tissues by centrifugal means. This process yields only about 75 percent to 80 percent of the rubber hydrocarbon present in the roots, and this yield can be increased only by running the separated plant tissues through a series of traps or settling basins from which additional traces of finely divided rubber of inferior quality are recovered.

The chief defects of this process result from the smallness of the rubber particles. The cutting of the roots prior to carbohydrate extraction reduces the rubber in the latex canals to small pieces, and the subsequent grinding treatment results in further comminution of the rubber. In order to recover the small particles of rubber from the caustic treated mass, a complicated continuous centrifuge must be employed, yielding two sources of liquid which have to be further settled in order to recover the small particles of rubber contained therein. Also, boiling with the caustic chemical tends to injure the quality of the rubber.

In accordance with the process of this invention, the rubber recovery is greatly simplified, and the quality of the rubber obtained is superior, since it has not been subjected to any caustic chemical treatment. In general, the whole washed roots, fresh or dried, are leached with hot water to remove carbohydrates and are then mill-crushed with water, resulting in a slurry in which the rubber is agglomerated in relatively large masses and is separated from the plant tissues. The slurry is then diluted and screened and the rubber and adhering skins remaining on the screen are scrubbed with water to separate the plant skins from the rubber. The resulting slurry is then dispersed in water and the floating rubber is removed while the plant debris sinks.

A description of the process in greater detail is as follows:

The whole, washed roots, with their tops removed to within approximately 1 inch of the crown, are subjected to a counter-current leaching in hot water to remove the carbohydrates. The roots are separated from the leaching water containing the carbohydrates, which carbohydrates are in such concentration that they can be hydrolyzed and fermented to alcohol by conventional means. If desired the roots may be dried at a temperature such as not to injure the rubber to facilitate carbohydrate extraction. Since the roots contain a large amount of carbohydrates, removal thereof increases the rubber concentration in the residue.

It is of particular significance that the roots remain virtually intact during the carbohydrate extraction process and the coagulated rubber in the latex canals remains in solid casts which coalesce into large rubber particles.

The whole roots are then pebble milled with sufficient water to obtain a slurry of the proper milling consistency. In the course of a short milling period, the plant tissues become crushed and the rubber is formed into large tangled clots.

After dilution with water, this mass is passed over a wet vibrating screen, water being sprayed on the screen, if necessary. A large part of the gel-forming and pulpy plant constituents pass through the screen with the liquid. This operation greatly reduces the time of the subsequent pebble milling. If desired, this liquid can be put through a settling trap for recovery of traces of small rubber particles, which will float off, and the sediment may be added to the carbohydrate liquors for fermentation.

The material passing over the vibrating screen contains over 90 per cent of all the rubber present in the plant, and consists largely of tangled masses of rubber strands and adhering root skins. This material is then again pebble milled with fresh water being added and milling continued for a short time to produce a scrubbing action, whereby the skins are freed from the rubber and become waterlogged.

The material from the remilling is then charged into a settling tank containing a large excess of water wherein the waterlogged skins and traces of plant material sink while the rubber floats to the surface. The floating mass of rubber is then skimmed off and can thereafter be treated by any of the conventional means for purifying, dewatering and drying.

It will be seen from the foregoing description that by keeping the roots intact prior to the milling, the rubber is retained within the latex canals in the form of long strings, thereby obviating the necessity for repeated sedimentation in order to free small particles of rubber from the plant materials. Boiling in a strong caustic chemical is not required to decompose the fleshy mass, as this is accomplished by a very short milling step which does not injure the rubber and which so conditions the plant material that the rubber can be easily removed by the screening operation and the subsequent pebble milling and settling. Also, having kept the rubber in entangled agglomerated masses, it can be easily floated off in the settling tank without the use of repeated sedimentations. Since large particles of rubber rise more rapidly than small ones and are less readily entrapped by settling plant material, the advantage of keeping the rubber in large pieces is apparent.

The following example exhibits a specific application of the process.

Dry whole kok-saghyz roots were leached in boiling water to remove the carbohydrates.

Fifty-five pounds of the resulting wet roots were charged into a 27-inch diameter pebble mill, together with 310 pounds of pebbles, enough water being added to make a liquid to solids ratio of 13.5 to 1.0, and the mill was operated for 5 minutes at 80 per cent of critical speed.

The contents were then discharged into water to give a liquid to solids ratio of 100 to 1, and this slurry was passed over a fine mesh vibrating screen.

The retained solids, after combining with an equal quantity of identical material from a similar milling, were then charged into a 27-inch diameter pebble mill, together with 310 pounds of pebbles, and the mill was operated for 15 minutes at 80 per cent of critical speed, using a liquid to solids ratio of 19 to 1.

The resulting slurry was diluted in a ratio of 55 parts water to 1 part slurry, was charged into a settling tank; the rubber was removed by skimming, and the removed rubber was freed from residual traces of plant tissue by boiling in water in the conventional manner.

Analyses of the various fractions at different stages of the recovery operation showed the following:

|  | Per cent |
|---|---|
| Rubber lost through screen after primary milling | 3.5 |
| Rubber recovered after secondary milling | 92.9 |
| Rubber remaining in bagasse | 3.6 |
| Total | 100.0 |

If desired, rubber can be recovered by sedimentation from the liquid passing the screen and from the bagasse by additional pebble milling.

The process also can be applied to fresh rather than dried roots. Following substantially the procedure of the example above, except that the roots were not dried and the secondary pebble milling time was 30 minutes instead of 15 minutes, analyses of various fractions at different stages of the recovery operation showed the following:

|  | Per cent |
|---|---|
| Rubber lost through screen after primary milling | 2.1 |
| Rubber recovered after secondary milling | 94.9 |
| Rubber remaining in bagasse | 3.0 |
| Total | 100.0 |

Having thus described the invention, what is claimed is:

The process of mechanically recovering rubber from the roots of Russian dandelions comprising leaching whole Russian dandelion roots with hot water to remove the carbohydrates, separating the roots from the leaching water containing the carbohydrates, then mill-crushing the leached whole roots in water to liberate the rubber from the pulpy root constituents and agglomerate it into relatively large masses; diluting the crushed roots with water and screening the resulting mass to remove most of the pulpy plant constituents from the rubber and adhering skins; milling the rubber and adhering skins which pass over the screen in water to free the skins from the rubber; settling in water the material from the milling step to float the rubber and sink the skins, and removing the floated rubber.

RODERICK K. ESKEW.
PAUL W. EDWARDS.